C. STILES.
AUTOMOBILE RADIATOR ORNAMENT.
APPLICATION FILED FEB. 24, 1915.
1,165,296.
Patented Dec. 21, 1915.
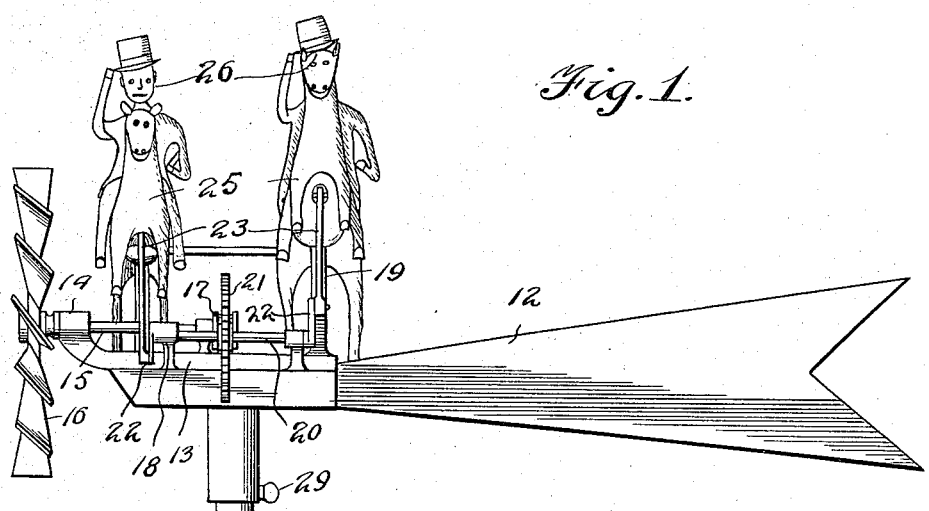
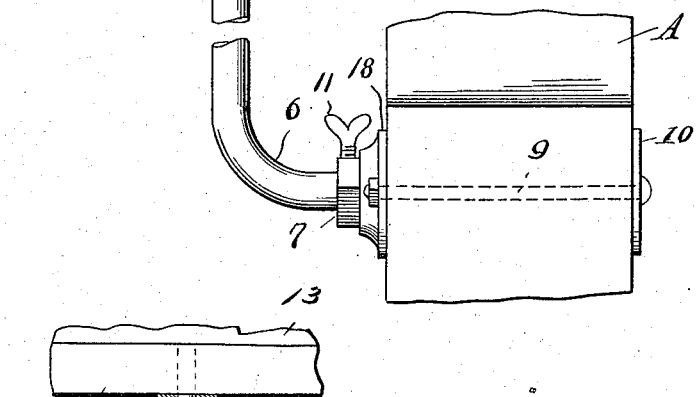
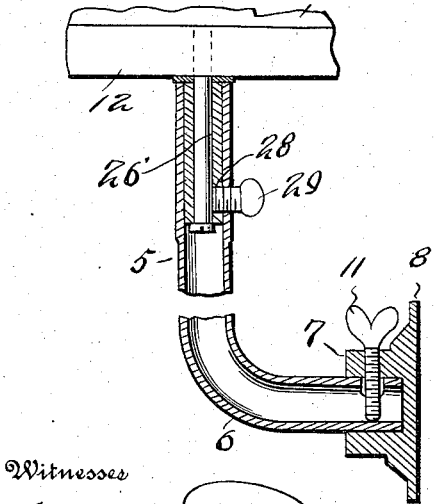

UNITED STATES PATENT OFFICE.

CHARLES STILES, OF ALTOONA, KANSAS.

AUTOMOBILE RADIATOR ORNAMENT.

1,165,296.      Specification of Letters Patent.      Patented Dec. 21, 1915.

Application filed February 24, 1915. Serial No. 10,355.

*To all whom it may concern:*

Be it known that I, CHARLES STILES, a citizen of the United States, residing at Altoona, in the county of Wilson and State of Kansas, have invented new and useful Improvements in Automobile Radiator Ornaments, of which the following is a specification.

The invention relates to radiator attachments for automobiles, and more particularly to the class of radiator ornaments.

The primary object of the invention is the provision of an ornament of this character wherein it is in the nature of a figure toy operated directly by air currents so that motion will be imparted thereto for rendering it attractive to the eye of an observer, and also to increase the ornamentality of the automobile.

Another object of the invention is the provision of a device of this character wherein it can be readily and easily applied to any type of radiator for automobiles, and is of novel form to afford attractiveness and ornamentality as well as amusement to an observer.

A further object of the invention is the provision of a device of this character which is simple in construction, and inexpensive in manufacture.

With these and other objects in view, the invention consists in the construction, combination and arrangement of parts as will be hereinafter fully described, illustrated in the accompanying drawing, and pointed out in the claim hereunto appended.

In the drawing:—Figure 1 is a fragmentary side view of an automobile radiator showing the device constructed in accordance with the invention applied thereto. Fig. 2 is a fragmentary vertical sectional view through the standard or bracket.

Similar reference characters indicate corresponding parts throughout the several views in the drawing.

Referring to the drawing in detail, A designates an automobile radiator on the front of which is mounted the ornament hereinafter fully described.

The ornament comprises a standard 5 which in this instance is in the form of a tube made from metal, having a curved end 6, and provides a bracket adapted for rotary adjustment and detachable connection in a socketed boss 7 formed centrally on a base or supporting plate 8, the same having passed therethrough bolts 9 carrying a clamping plate 10, and in this manner the bracket is fixed to the radiator A, the boss 7 being provided with a wing headed set screw 11 for fastening the bracket in position for its adjustment.

Mounted for swinging movement on the standard 5 is a substantially arrow shaped vane 12 which has fixed to its pivoted end a bearing plate 13 formed with spaced longitudinally arranged central bearings 14 in which is journaled a wind wheel shaft 15 carrying at its forward end the bladed wind wheel 16, while fixed on its rear end is a pinion gear 17, and at opposite longer edges of the said plate 13 are spaced bearings 18 and 19, respectively, for a purpose presently described.

Journaled in the bearings 18 is a rotatable counter shaft 20 to which is fixed a gear 21 meshing with the pinion gear 17, and on the ends of this shaft 20 are cranks 22 having loosely connected thereto links or levers 23, the same being connected through the medium of pivots 24 with rocking figures 25 representing horses on which are images 26 indicative of horseback riders, the latter being fixed in any suitable manner to the figures, which are pivoted at 27 to the bearings 19 on the plate 13, it being seen that when the wind wheel 16 is rotated under the influence of air currents the figures and images thereon will be rocked to give the appearance of galloping horses with their riders.

The arrow vane 12 is swingingly connected to the standard 5 through the medium of a pivot stem 26' which is telescoped within the upper end of the said standard and is provided with a notch 28 in which projects a set screw 29 threaded in the said standard so as to fasten the stem 26 therein to limit the swinging movement of the arrow vane. The arrow vane serves to guide the wind wheel and hold it in a position to face the wind currents so that such currents will rotate the wheel and thereby set in motion the figures and images carried thereby.

It is of course understood that the ornament is adaptable for a post, porch, or can be mounted at any point, and will be operated under the influence of air currents, as hereinbefore set forth. In fact the ornament can be used as a weather vane, as will be clearly obvious, and by reason of its make up will lend attraction and ornamentality.

From the foregoing description, taken in connection with the accompanying drawing, the construction and manner of operation of the device will be clearly understood, and therefore a more extended explanation has been omitted.

What is claimed is:—

The combination with an article having a base provided with a vertical pintle, of a bracket comprising an elbow-shaped tube receiving in one end thereof the pintle, a sleeve carried by the pintle and engaged in the tube, a set screw threaded in the tube and engaged in the sleeve for fastening the same therein, a supporting plate having a socketed boss receiving the other end of the elbow shaped tube, a clamping plate coöperative with the supporting plate, bolt members connecting the said supporting and clamping plates together and adapted to fasten the same upon the radiator of an automobile, and a set screw threaded in the boss and engageable with the tube to lock the same in the socket therein.

In testimony whereof I affix my signature in presence of two witnesses.

CHARLES STILES.

Witnesses:
 TURNER D. JONES,
 MARY McLAREN.

Copies of this patent may be obtained for five cents each, by addressing the "Commissioner of Patents, Washington, D. C."